US009436177B2

(12) United States Patent
Kurakake et al.

(10) Patent No.: US 9,436,177 B2
(45) Date of Patent: Sep. 6, 2016

(54) NUMERICAL CONTROL SYSTEM HAVING MULTI-CORE PROCESSOR

(75) Inventors: Mitsuo Kurakake, Minamitsuru-gun (JP); Toru Kobayashi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 1056 days.

(21) Appl. No.: 13/569,546

(22) Filed: Aug. 8, 2012

(65) Prior Publication Data
US 2013/0041510 A1 Feb. 14, 2013

(30) Foreign Application Priority Data
Aug. 10, 2011 (JP) .................................. 2011-174751

(51) Int. Cl.
G05B 19/18 (2006.01)
G05B 19/414 (2006.01)
(52) U.S. Cl.
CPC . *G05B 19/4141* (2013.01); *G05B 2219/34047* (2013.01); *G05B 2219/41002* (2013.01)
(58) Field of Classification Search
USPC ........................................................ 700/275
See application file for complete search history.

(56) References Cited

U.S. PATENT DOCUMENTS 5,940,292 A  8/1999  Kurakake et al.

FOREIGN PATENT DOCUMENTS

| CN | 201298167 Y | 8/2009 |
| CN | 102073302 A | 5/2011 |
| JP | 06-56801 U | 8/1994 |
| JP | 9-69004 | 3/1997 |
| JP | 2008204366 A | 9/2008 |
| JP | 2011067884 A | 4/2011 |

OTHER PUBLICATIONS

Abourida et al., "Real-time platform for the control prototyping and simulation of power electronics and motor drives", Proceedings of the Third International Conference on Modeling, Simulation and Applied Optimization, ICMSAO 2009.*
Qin et al., "Research on the control system of special sewing equipment with multiprocessor," Machine Design and Research, China Academic Journal Electronic Publishing House, 2007, pp. 115-118.

* cited by examiner

*Primary Examiner* — Carlos Ortiz Rodriguez
(74) *Attorney, Agent, or Firm* — Drinker Biddle & Reath LLP

(57) ABSTRACT

A motor driving amplifier and a numerical controller are connected to each other via communication to configure a numerical control system. The numerical controller includes a numerical control unit, a motor control unit, and an amplifier interface unit. Furthermore, a motor control processor included in the motor control unit is a multi-core processor.

10 Claims, 5 Drawing Sheets

NUMERICAL CONTROL SYSTEM HAVING MULTI-CORE PROCESSOR

RELATED APPLICATION DATA

This application claims priority under 35 U.S.C. §119 and/or §365 to Japanese Application No. 2011-174751 filed Aug. 10, 2011, the entire contents of which are incorporated herein by reference.

BACKGROUND OF THE INVENTION

1. Field of the Invention

The present invention relates to a numerical control system having a numerical controller connected via communication to a motor driving amplifier which drives a motor included in a machine, the device having a motor control unit controlling the motor mounted therein.

2. Description of the Related Art

In a numerical controller, for example, as disclosed in Japanese Patent Application Laid-Open No. 9-69004, functions of a numerical control unit, a motor control unit, a PMC (programmable machine controller) unit, and others are connected to each other via a bus. FIG. 6 is a diagram depicting a schematic structure of a numerical controller using a conventional technology. In general, as a motor control processor for use in a motor control unit, a low-price DSP (digital signal processor) is often used.

In the structure in which a motor driving amplifier is connected via communication and motor control processors are collectively mounted on a numerical controller, the number of control axes for each motor control processor has an upper limit, and therefore the number of motor control processors has to be increased as the number of control axes in the numerical controller is increased. This is because the number of axes of the numerical controller varies depending on the machine tool to be controlled.

If a low-price DSP is used as a motor control processor for the motor control unit, it is convenient to easily adjust the number of processors according to the number of control axes. However, the low-price DSP is generally connected to an external resource via a general-purpose parallel bus and thus cannot be directly connected to a local bus. Therefore, a bus bridge is required. For this reason, the number of connection pins is increased. With an increase in the number of low-price DSPs, the number of LSIs of the bus bridge also has to be increased, restricting the number of mountable DSPs. Moreover, an increase of the number of control axes is adjusted with the number of DSPs, and therefore a small-sized DSP with low power consumption has to be selected.

As described above, in the method of using low-price DSPs as motor control processors to increase the number of motor control processors, that is, low-price DSPs, for use to enhance scalability of the numerical controller, it has been difficult to address the need in recent years for making a machine tool multi-axial and high-functional. This is because the number of mountable processors has a limit and it has been extremely difficult to increase operating frequency in recent semiconductor technology. It is also difficult to increase the number of control axes per processor.

SUMMARY OF THE INVENTION

An object of the present invention is to provide a numerical control system controlling a machine that can be multi-axis and high functional, by using a multi-core processor, while keeping cost low.

A numerical control system according to the present invention has a motor driving amplifier which drives a motor included in a machine and a numerical controller connected to the motor driving amplifier via communication. The numerical controller includes a numerical control processor outputting a moving instruction; a motor control processor outputting an instruction for driving the motor based on the moving instruction from the numerical control processor, a communication interface of the motor driving amplifier which drives the motor based on the instruction from the motor control processor, and an amplifier interface unit connecting the numerical control processor and the motor control processor together; wherein the motor control processor is a multi-core processor.

The numerical control processor may be allocated to a core of the multi-core processor.

The numerical controller may further include a programmable machine controller processor which controls a DI/DO signal to the machine and exchanges data with the numerical control unit, and the programmable machine controller processor may be allocated to a core of the multi-core processor.

An axis to be controlled may be allocated to each core of the multi-core processor as the motor control processor.

The motor control processor may have core processors a minimum number of which is determined by the number of control axes of the numerical control system and the number of axes that can be processed by one core processor.

The connection between the multi-core processor and the amplifier interface unit may be serial communication.

The serial communication may be any one of PCIExpress, HyperTransport, and RapidIO.

According to the present invention, it is possible to provide a numerical control system controlling a machine that can be multiaxis and high functional, by using a multi-core processor, while keeping cost low.

DETAILED DESCRIPTION OF THE PREFERRED EMBODIMENTS

Figure 1:
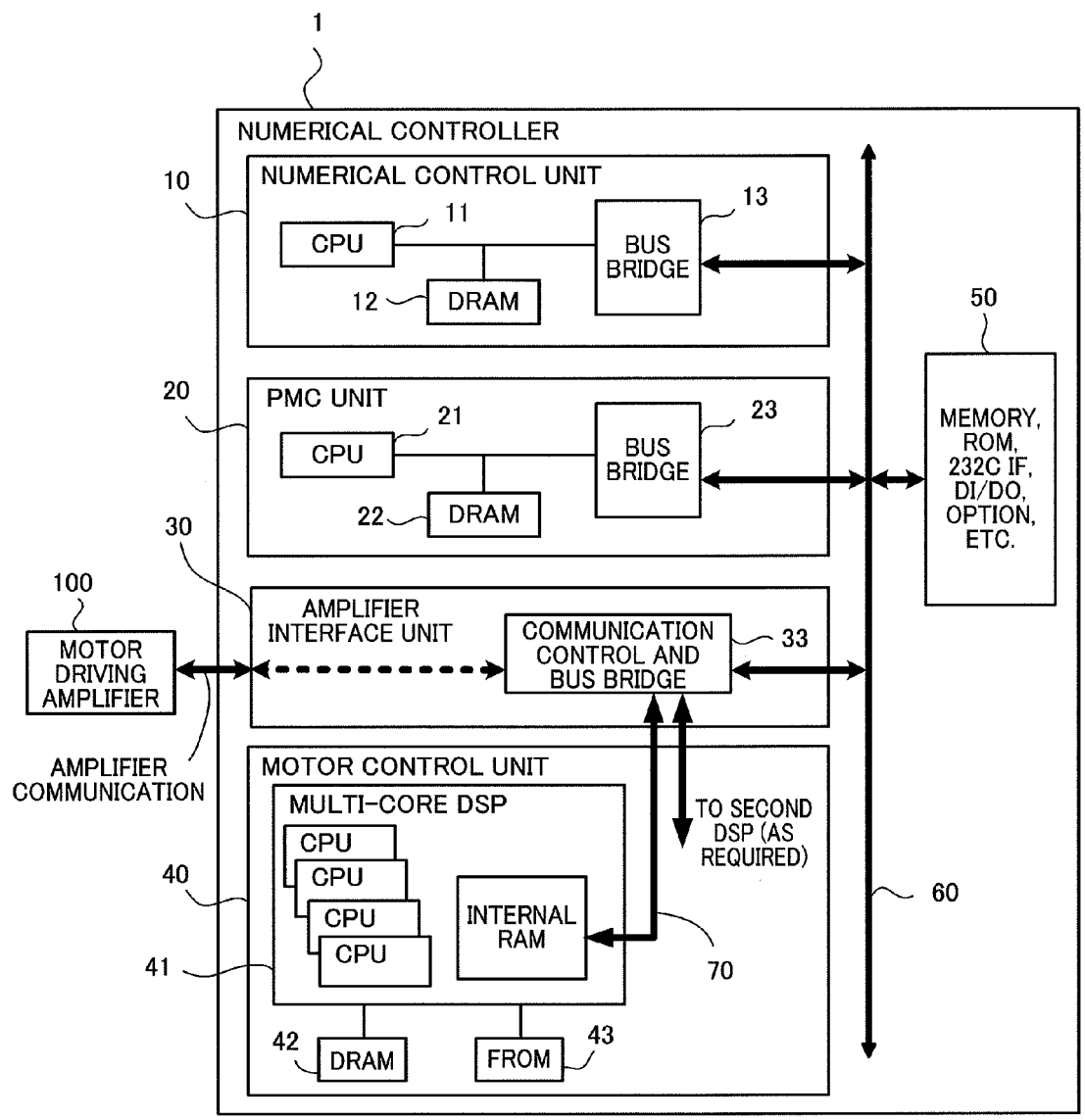
FIG. 1 is a diagram for explaining an embodiment of a numerical controller configuring a numerical control system using a multi-core processor, according to the present invention.

A numerical controller configuring a numerical control system using a multi-core processor according to the present invention is explained by using FIG. 1.

A numerical controller 1 controls a motor (not shown) included in a machine such as a machine tool or an industrial machine. The numerical controller 1 includes a numerical control unit 10, a PMC unit (programmable machine controller unit) 20, an amplifier interface unit 30, a motor control unit 40, and a memory etc. unit 50. The numerical control unit 10, the PMC unit 20, the amplifier interface unit 30, and the memory etc. unit 50 are connected to each other via a local bus 60. Note that, as depicted in FIG. 1, the memory etc. unit 50 is the collective name of a ROM, a 232C interface, a DI/DO circuit, and other optional circuits.

The numerical control unit 10 includes a numerical control processor 11, a DRAM 12, and a bus bridge 13, and these are connected to each other via an internal bus 14. The numerical control processor 11 is a processor executing a function of interpreting an operating instruction issued from a machining program or the like to calculate a moving instruction for a servo motor of each axis, a function of interpreting an operating instruction to transmit and receive an ON/OFF signal to and from the machine, and a function of communicating with an operator of the machine through a keyboard and a display unit such as a liquid-crystal display device. The DRAM 12 is used as a working memory. Also, the numerical control unit 10 is connected to the local bus 60 via the bus bridge 13 and is connected to the PMC unit 20, the amplifier interface unit 30, and the memory etc. unit 50. The numerical control processor 11, the DRAM 12, and the bus bridge 13 are each configured as an LSI.

The PMC unit 20 has a sequence control function of controlling a DI/DO signal to the machine and a function of exchanging data with the numerical control unit 10. The PMC unit 20 includes a PMC processor 21, a DRAM 22, and a bus bridge 23, and these are connected to each other via an internal bus 24. The PMC unit 20 is connected to the local bus 60 via the bus bridge 23.

The amplifier interface unit 30 includes a communication control and bus bridge 33, and is connected to the local bus 60 via the communication control and bus bridge 33. Also, the communication control and bus bridge 33 includes an interface 70 with a multi-core DSP. The amplifier interface unit 30 is connected to a motor driving amplifier 100 via the interface 70 of the communication control and bus bridge 33.

The motor control unit 40 includes a multi-core DSP 41, which is a motor control processor, a DRAM 42, and an FROM 43. The multi-core DSP 41 has a plurality of (four in the example of FIG. 1) CPU cores and an internal RAM. The multi-core DSP 41 is connected to the communication control and bus bridge 33 of the amplifier interface unit 30 via the interface 70. The multi-core DSP 41 is a processor that performs position feedback control, speed feedback control and current control based on a moving instruction for each axis issued from the numerical control unit 10 and feedback signals of the position, speed and current fed back from a position/speed detector and a current detector incorporated in the servo motor for each axis and generates an instruction for the motor driving amplifier 100. The motor control unit 40 obtains the feedback signals through amplifier communication between the motor driving amplifier 100 and the amplifier interface unit 30 and an interface between the amplifier interface unit 30 and the motor control processor.

As described above, the numerical controller 1 is configured by using one multi-core DSP 41. In the conventional technology, a plurality of DSPs are used to configure a motor control unit. In an embodiment of the numerical controller according to the present invention, one multi-core DSP is used for configuration, thereby decreasing the number of DSP chips. With this, even a somewhat-large package size of the multi-core DSP or increased power consumption to some degree does not pose a problem, and therefore a high-performance multi-core DSP can be mounted.

Also, when the interface 70 is applied to high-speed serial communication, the number of signal pins is decreased compared with a parallel bus. Therefore, cost can be lowered, and the mounting area can be narrowed. A parallel bus for use in the conventional technology has many signal pins and, as the number of DSPs for use is increased, the number of bus bridges has to be increased. By contrast, in an embodiment of the numerical controller according to the present invention, with the use of high-speed serial communication, the problem in the conventional technology can be solved.

Note that standards such as PCIExpress, HyperTransport, and RapidIO can be used for high-speed communication and these are not restrictive.

Figure 2:
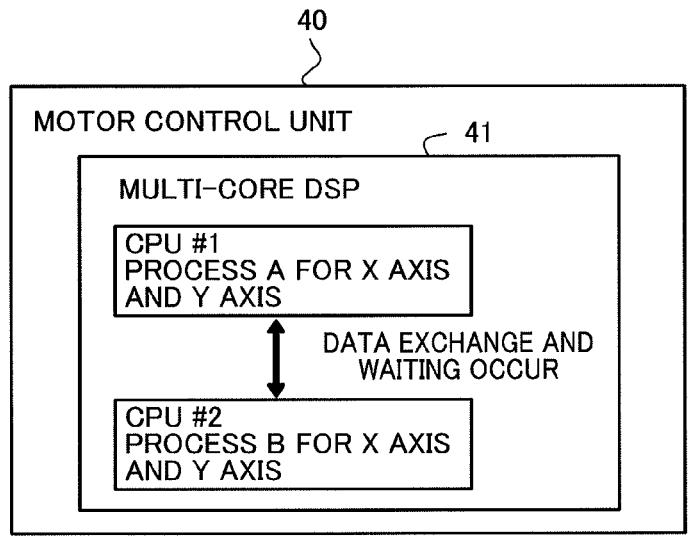
FIG. 2 is a diagram for explaining that a process A for an X axis and a Y axis and a process B for the X axis and the Y axis are performed by separate cores in a motor control processor in the numerical controller of FIG. 1.

In the motor control unit 40 in the numerical controller of FIG. 1, a process A for an X axis and a Y axis and a process B for the X axis and Y axis are performed by separate cores, which is now explained by using FIG. 2.

If processes for a certain control axis (for example, processes for the X axis and the Y axis) are performed over a plurality of cores (for example, as depicted in FIG. 2, the process A for the X axis and the Y axis and the process B for the X axis and the Y axis are performed by separate cores) for the reason that it is difficult to perform processes for one axis control in parallel , data exchange and waiting often occur among the cores, thereby decreasing process efficiency.

The motor control unit 40 includes the multi-core DSP 41, and the multi-core DSP 41 has two CPU cores: CPU #1 and CPU #2. The process A for the X axis and the Y axis is performed by CPU #1, and the process B for the X axis and the Y axis is performed by CPU #2. That is, the processes for the control axes which are the X axis and the Y axis are preformed over two CPU cores. Therefore, data exchange and waiting often occur among the cores.

Figure 3:
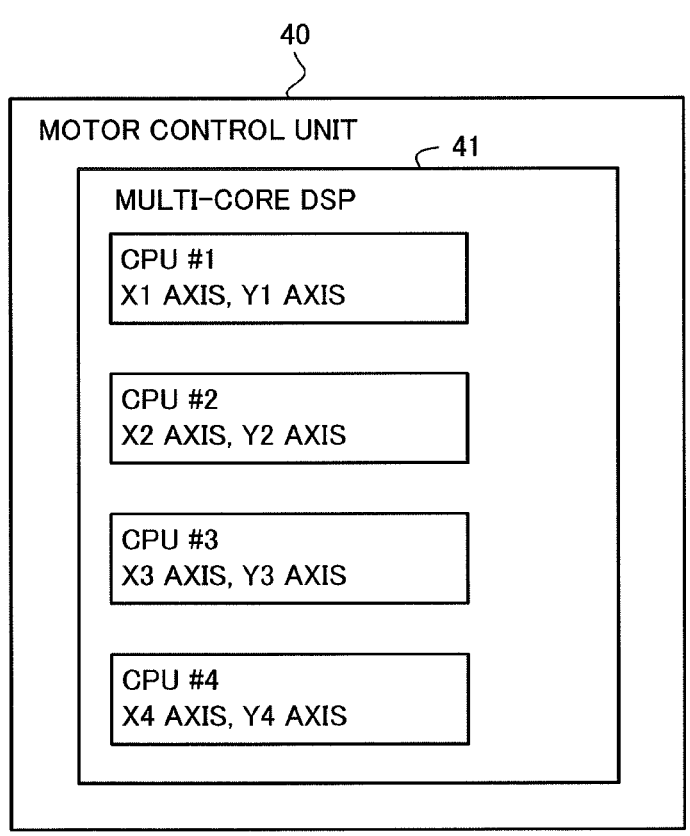
FIG. 3 is a diagram for explaining an embodiment of the numerical control system according to the present invention in which a control axis to be handled is allocated to each core in the motor control processor in the numerical controller of FIG. 1.

An embodiment of the numerical control system according to the present invention in which a control axis to be handled is allocated to each core in the motor control unit 40 in the numerical controller of FIG. 1 is described by using FIG. 3. A motor control unit 40 depicted in this FIG. 3 solves the problem described above in the motor control unit 40 depicted in FIG. 2.

As depicted in FIG. 3, the motor control unit 40 includes a multi-core DSP 41, and the multi-core DSP 41 has four CPU cores: CPU #1, CPU #2, CPU #3, and CPU #4. A process for an X1 axis and a Y1 axis is allocated to CPU #1, a process for an X2 axis and a Y2 axis is allocated to CPU #2, a process for an X3 axis and a Y3 axis is allocated to CPU #3, and a process for an X4 axis and a Y4 axis is allocated to CPU #4. Also, a control axis to be handled is allocated to each of these CPU #1 to CPU #4. The process of each control axis can be basically independently performed. Therefore, when a process is allocated for each control axis, data exchange and waiting among the cores can be minimized, and a decrease in process efficiency for each core can be prevented.

Figure 4:
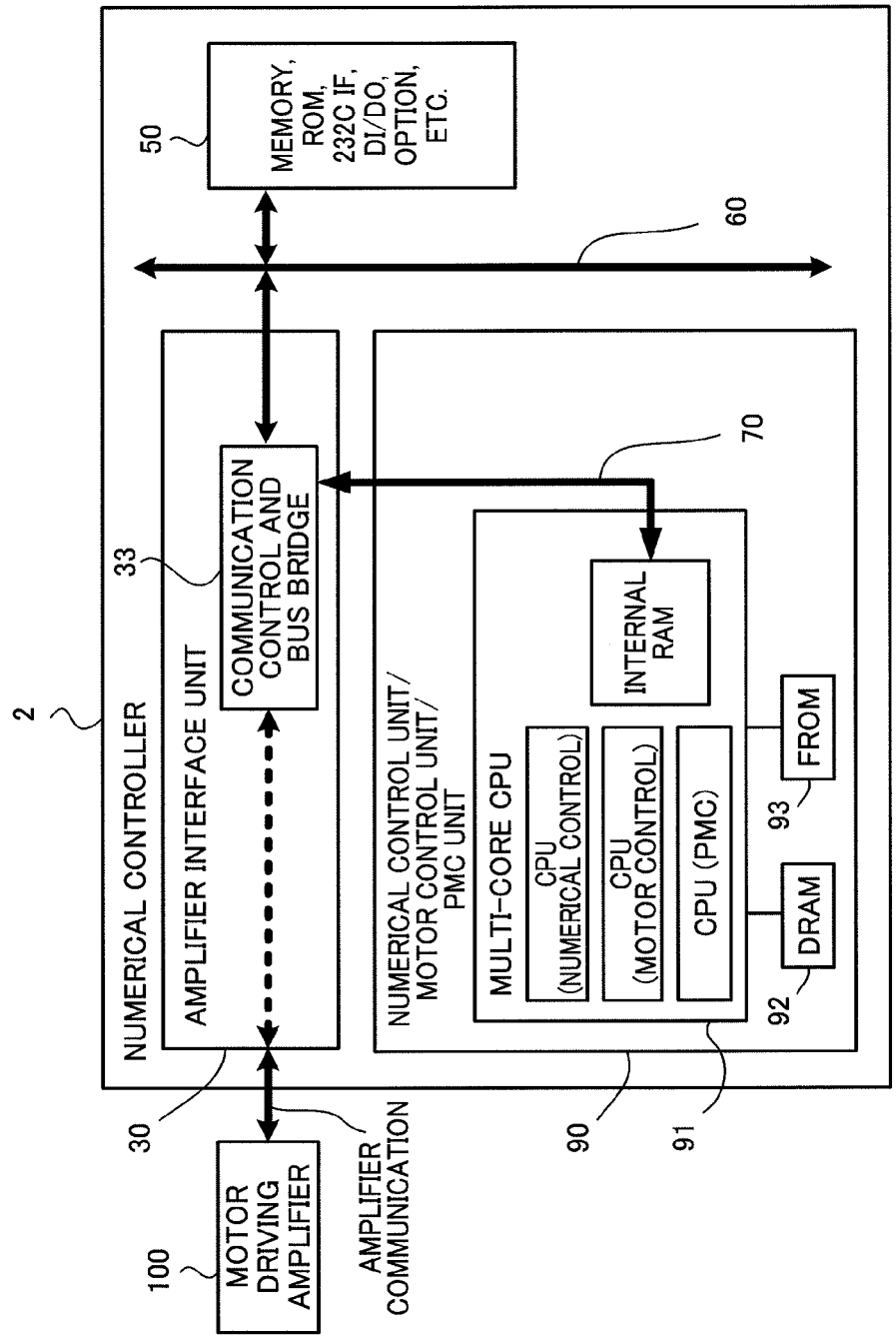
FIG. 4 is a diagram for explaining another embodiment of the numerical control system according to the present invention including a low-price numerical controller with a small number of control axes.

FIG. 4 is a diagram for explaining another embodiment of the numerical control system according to the present invention including a low-price numerical controller with a small number of control axes.

When the number of motors included in the machine is small, that is, when the number of control axes is small, a low-price numerical controller with a small number of control axes is used. Since the number of CPUs required for motor control is small, the numerical control unit, the PMC unit, and the motor control unit can be unified into a multi-core CPU.

A numerical controller 2 includes the amplifier interface unit 30, a numerical control unit/motor control unit/PMC unit 90, and the memory etc. unit 50, and these units are connected to each other via the local bus 60.

The numerical control unit/motor control unit/PMC unit 90 includes a multi-core CPU 91, a DRAM 92, and an FROM 93. The multi-core CPU 91 includes a plurality of (three in the example of FIG. 4) CPUs and an internal RAM. To the plurality of CPUs configuring the multi-core CPU 91 of the numerical control unit/motor control unit/PMC unit 90, the function of the numerical control unit 10, the function of the PMC unit 20, and the function of the motor control unit 40 described above are allocated, respectively. The multi-core CPU 91 is connected to the communication control and bus bridge 33 of the amplifier interface unit 30 via the interface 70.

Note that while FIG. 4 depicts the numerical controller 2 in which three functions of the numerical control unit, the motor control unit and the PMC unit are respectively allocated to the cores of the multi-core CPU 91, an embodiment may be such that the functions of the numerical control unit and the motor control unit may be respectively allocated to the cores of the multi-core CPU 91.

Figure 5:
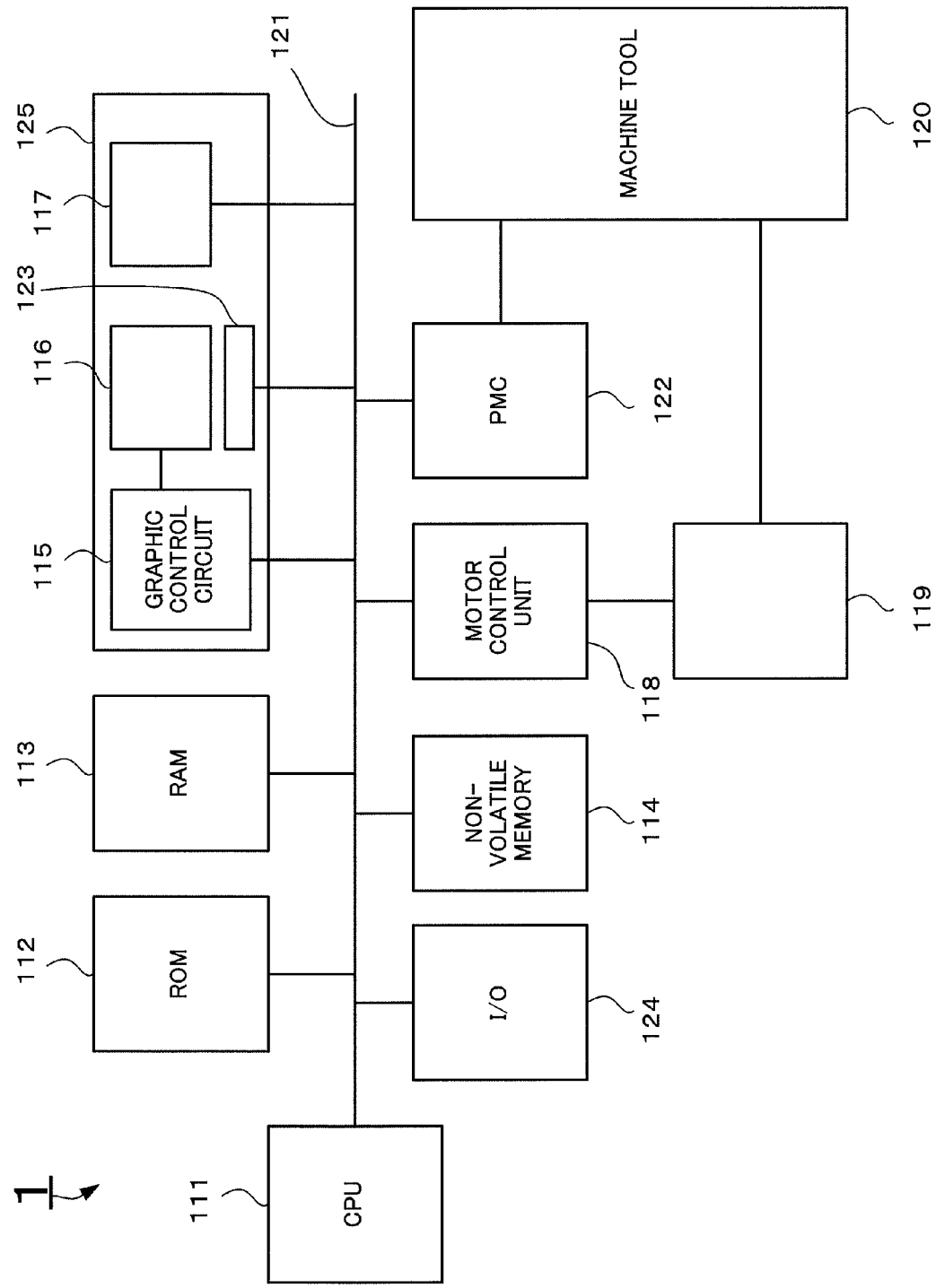
FIG. 5 is a block diagram schematically depicting the structure of an embodiment of a numerical control system according to the present invention.
Figure 6:
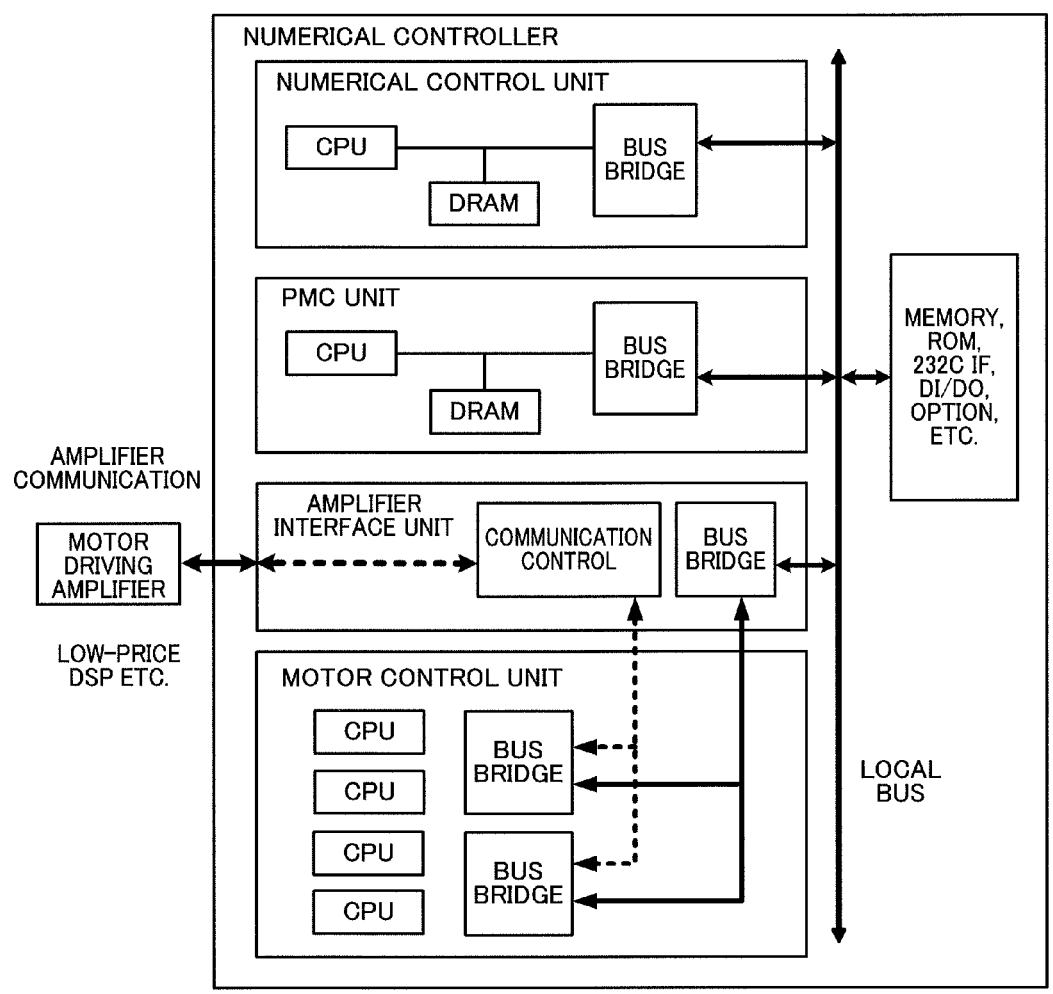
FIG. 6 is a schematic structural diagram of a conventional numerical controller.

The structure of an embodiment of the numerical control system according to the present invention is schematically described by using a block diagram of FIG. 5.

A CPU 111 as a processor controls the entire numerical controller 1 by following a system program stored in a ROM 112. In a RAM 113, various types of data or input and output signals are stored. Various types of data stored in a non-volatile memory 114 are retained as they are even after the power is turned off. A graphic control circuit 115 converts a digital signal to a signal for display and delivers the signal for display to a display device 116. A keyboard 117 is means for inputting various setting data, having numerical keys, character keys and others.

A motor control unit 118 receives a moving instruction for each axis from the CPU 111 and outputs the instruction for each axis to a servo amplifier 119. Upon receiving this moving instruction, this servo amplifier 119 drives a servo motor (not shown) of a machine tool 120. These components are coupled to each other via a bus 121. When a machining program is executed, a PMC 122 receives a T function signal (a tool selecting instruction) via the bus 121. Then, this signal is processed with a sequence program and a signal is outputted as an operating instruction to control the machine tool 120. Also, upon receiving a state signal from the machine tool 120, an input signal necessary for the CPU 111 is transferred. Furthermore, software keys 123 of which functions change depending on a system program or the like and an interface 124 for transmitting NC data to an external device such as a storage device are connected to the bus 121. These software keys 123, as well as the display device 116 and the keyboard 117, are provided to a display device/MDI (manual data input) panel 125. Note that the motor control unit 118 and the servo amplifier 119 are connected to each other via the interface 70 as depicted in FIG. 1.

The invention claimed is:

1. A numerical control system having a motor driving amplifier which drives a motor included in a machine and a numerical controller connected to the motor driving amplifier via communication, the numerical controller comprising:
   a numerical control processor outputting a moving instruction;
   a motor control processor outputting an instruction for driving the motor based on the moving instruction from the numerical control processor;
   a communication interface of the motor driving amplifier which drives the motor based on the instruction from the motor control processor; and
   an amplifier interface unit connecting the numerical control processor and the motor control processor together, wherein
   the motor control processor is a multi-core processor, and wherein the numerical control processor is allocated to a core of the multi-core processor.

2. The numerical control system according to claim 1, wherein an axis to be controlled is allocated to each core of the multi-core processor as the motor control processor.

3. The numerical control system according to claim 1, wherein the motor control processor has core processors a minimum number of which is determined by the number of control axes of the numerical control system and the number of axes that can be processed by one core processor.

4. The numerical control system according to claim 1, wherein connection between the multi-core processor and the amplifier interface unit is serial communication.

5. The numerical control system according to claim 4, wherein the serial communication is any one of PCIExpress, HyperTransport, and RapidIO.

6. A numerical control system having a motor driving amplifier which drives a motor included in a machine and a numerical controller connected to the motor driving amplifier via communication, the numerical controller comprising:
   a numerical control processor outputting a moving instruction;
   a motor control processor outputting an instruction for driving the motor based on the moving instruction from the numerical control processor;
   a communication interface of the motor driving amplifier which drives the motor based on the instruction from the motor control processor;
   an amplifier interface unit connecting the numerical control processor and the motor control processor together; and
   a programmable machine controller processor which controls a DI/DO signal to the machine and exchanges data with the numerical control unit, wherein
   the motor control processor is a multi-core processor and the programmable machine controller processor is allocated to a core of the multi-core processor.

7. The numerical control system according to claim 6, wherein an axis to be controlled is allocated to each core of the multi-core processor as the motor control processor.

8. The numerical control system according to claim 6, wherein the motor control processor has core processors a minimum number of which is determined by the number of control axes of the numerical control system and the number of axes that can be processed by one core processor.

9. The numerical control system according to claim 6, wherein connection between the multi-core processor and the amplifier interface unit is serial communication.

10. The numerical control system according to claim 9, wherein the serial communication is any one of PCIExpress, HyperTransport, and RapidIO.

* * * * *